April 29, 1941.  R. E. STANLEY  2,240,166
EMERGENCY AIR BRAKE SYSTEM
Filed Oct. 28, 1939   2 Sheets-Sheet 1

INVENTOR.
Richard E. Stanley
BY Howy Hamilton
ATTORNEYS

April 29, 1941.    R. E. STANLEY    2,240,166
EMERGENCY AIR BRAKE SYSTEM
Filed Oct. 28, 1939    2 Sheets-Sheet 2

INVENTOR.
Richard E. Stanley
BY Hoover & Hamilton
ATTORNEYS

Patented Apr. 29, 1941

2,240,166

UNITED STATES PATENT OFFICE 2,240,166

EMERGENCY AIR BRAKE SYSTEM

Richard E. Stanley, Kansas City, Mo.

Application October 28, 1939, Serial No. 301,787

6 Claims. (Cl. 303—13)

This invention relates to brake systems for vehicles and the primary object is to provide an emergency fluid brake system that may be brought into use upon failure of any part of the equipment forming the conventional brake apparatus.

One of the important aims of this invention is the provision of an air brake system having a separate set of conduits extending directly to each brake unit of the vehicle and forming the piping of an auxiliary or emergency system that is automatically maintained inoperative by air pressure in the regular braking equipment, until it is desired or becomes necessary to employ the emergency features of the system.

A still further object of this invention is to provide a brake system of the aforementioned character wherein is included means for indicating the air pressure, which indicating means is adjustable so that the operator may manipulate the indicator to cause the signal thereof to function when air pressure in the brake system drops to a predetermined point.

One of the further objects of this invention is the provision of an attachment for brake units of a system of the aforementioned character, which attachment is formed to cooperate with the conventional housing of the brake unit and designed to operably join the piping of the main and an emergency brake system to the unit in such fashion as to employ the standard port of the brake unit so that compressed air will pass therethrough from the piping of either of said main or emergency system.

Minor objects of the invention will appear during the course of the following specification, referring to the accompanying drawings wherein.

Figure 1:
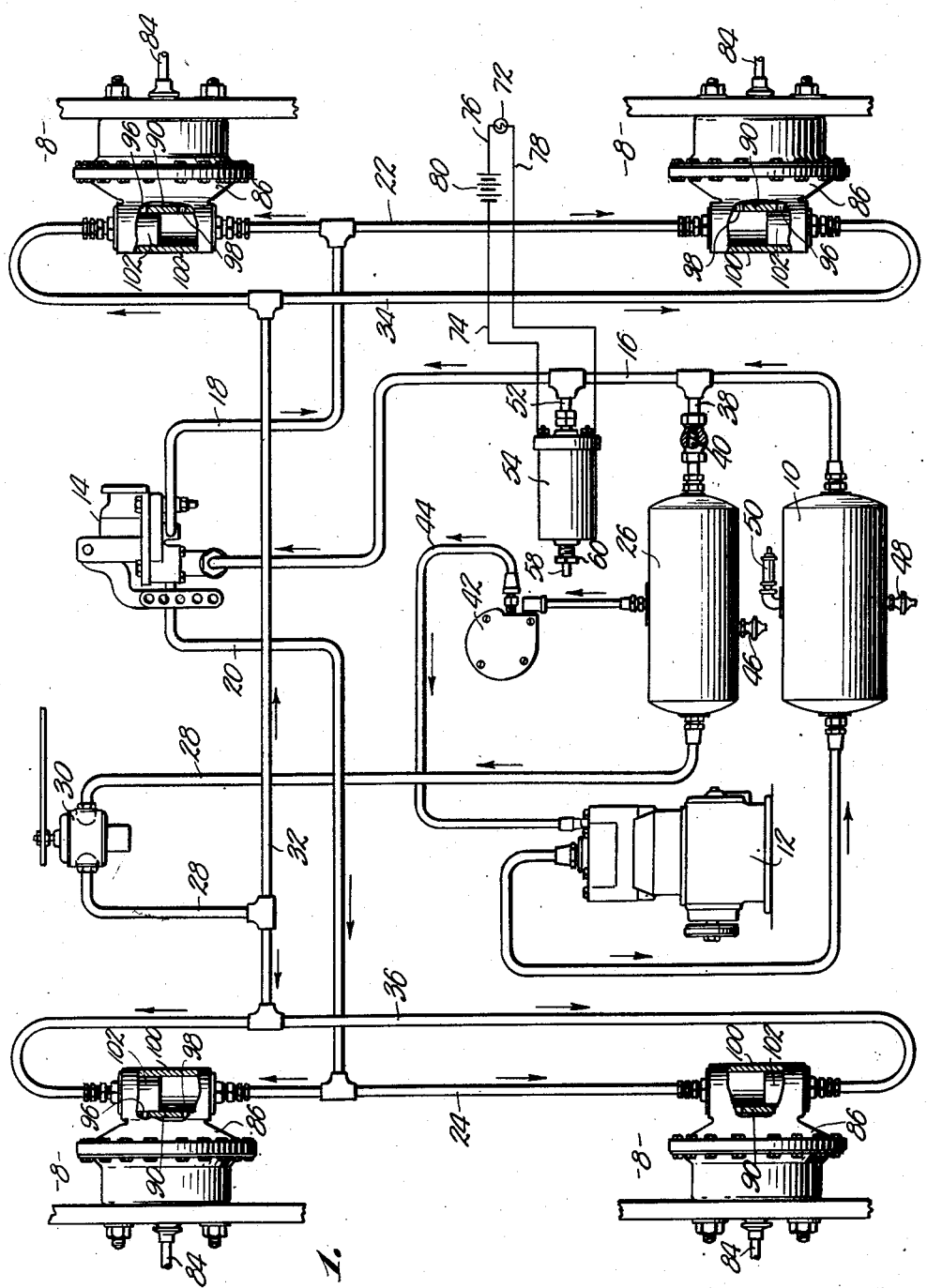
Figure 1 is a diagrammatic view of an air brake system made to embody the present invention.

Fluid brake systems in the nature of those employing compressed air and which commonly form a part of a vehicle having a plurality of wheels, comprises a number of brake units 8 each joined to a storage tank 10, the air pressure in which is maintained at a predetermined point by compressor 12.

A valve 14 interposed between tank 10 and brake units 8, serves to control the passage of air to said units and in the illustrated embodiment, conduit 16 extends from tank 10 to valve 14. From this valve, conduits 18 and 20 pass to conduits 22 and 24 respectively, the ends of which are connected to a brake unit 8.

The emergency portion of the system comprises a reservoir 26 which is also operably connected to each brake unit 8 and the piping employed for such connection comprises pipe 28 wherein is interposed a valve 30. Pipe 32 joins pipe 34 at its one end, and pipe 36 at the other end thereof, and these pipes 34 and 36 have their ends in connection with a brake unit 8.

A branch pipe 38 having a check valve 40 therein interconnects reservoir 26 and pipe 16 and a conventional governor 42 which automatically limits reservoir pressure in a manner now well-known in the art is interposed in a pipe 44 which extends from the emergency reservoir 26 to compressor 12.

Reservoir 26 has a drain cock 46 thereon and a similar drain cock 48 is on tank 10. A safety valve 50 should likewise be mounted on tank 10.

Figure 4:
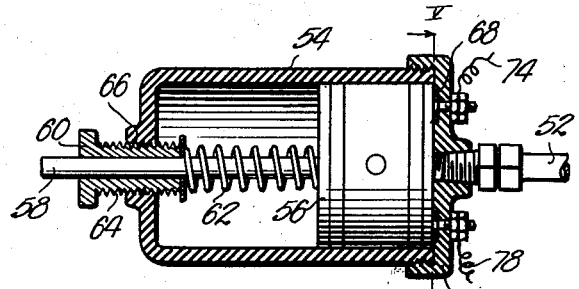
Fig. 4 is an enlarged longitudinal central sectional view through a portion of the pressure indicator.

An adjustable pressure indicator is joined to pipe 16 by branch 52 and since this invention contemplates an adjustable indicator that may be manipulated by the operator of the vehicle having this system as a part thereof, the indicator should be constructed as detailed in Fig. 4.

Cylinder 54 is in communication with branch 52 the latter being joined to cylinder 54 at one end thereof so that as air under pressure enters cylinder 54, reciprocating piston 56 will have a tendency to move toward the other end of the cylinder.

Piston stem 58 extends through sleeve 60 and a compression spring 62 is coiled around stem 58 so that one end of the spring bears against piston 56 while the other end thereof is against the inner end of sleeve 60. This sleeve 60 is provided with external screw-threads 64 which cooperate with the tapped opening 66 formed through the end of cylinder 54 and when sleeve 60 is rotated, it will move toward and from piston 56 to increase or diminish the force of spring 62 upon piston 56.

Contact points 68 carried by cap 70 forming one end of cylinder 54, are joined to a signal lamp, or any audible or visible signaling member 72, through the medium of wires 74, 76 and 78. A battery 80, or other source of energy forms a part of the electrical circuit which is closed when piston 56 is in the position shown in Fig. 4.

Interconnecting contact points 68 occurs when air pressure in cylinder 54 is reduced to a point where spring 62 is strong enough to force piston 56 to one end of its path of travel. Thus, when signal lamp 72 is burning, the operator will know that air pressure in the main braking system is below that required to safely operate the brakes of the vehicle and may then bring into use the emergency system by manipulating valve 30.

It is important that the conduits and pipes forming parts of the regular and emergency systems respectively, be joined directly to the brake units 8 so that in no instance is a single tube, pipe or conduit relied upon as a means for operating the brake system when air from either tank 10 or 26 is being passed to units 8. The preferred manner of constructing a unit which is at each wheel is shown in Fig. 2.

Moving arm 82, by applying force to connecting rod 84, will apply the brakes and the means for forcing the connecting rod in the direction of the arrow, comprises a housing 86 having a cavity 88 therein for the reception of head 90 integral with connecting rod 84. A spring 92 yieldably maintains connecting rod 84 at one end of its path of travel where the brakes are not set.

Diaphragm 94 in cavity 88 divides the latter into two portions one of which is in communication with ports 96 and 98 provided through one wall of housing 86. A cylinder 100 integral with the wall of housing 86, through which is formed ports 96 and 98, contains valve 102 which is free to reciprocate within cylinder 100 and the size of valve 102 is such as to cause it to restrict one port when at one end of its path of travel, and to cover the other port when at the opposite end of its path of travel.

Figure 2:
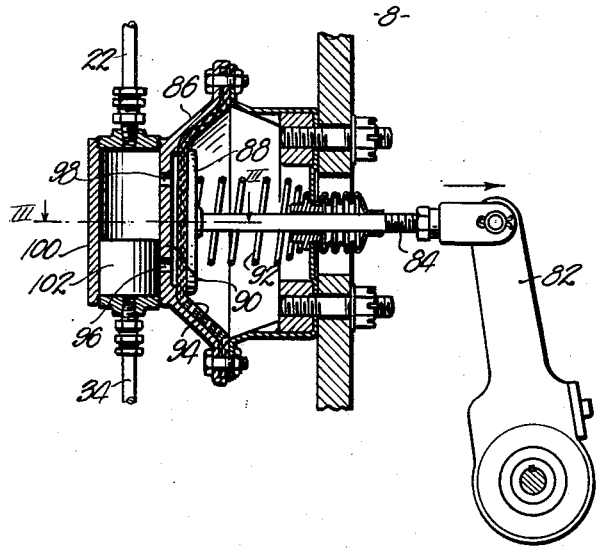
Fig. 2 is an enlarged fragmentary detailed sectional view through one of the brake units of the system, illustrated in Fig. 1.
Figure 5:
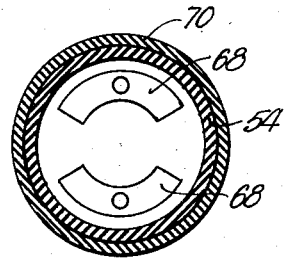
Fig. 5 is a sectional view through said indicator taken on line V—V of Fig. 4.
Figure 3:
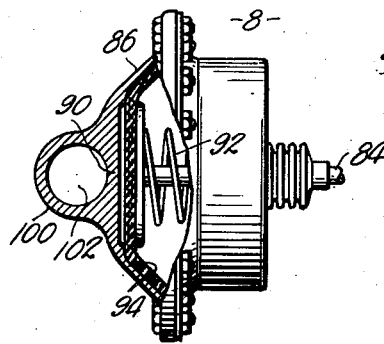
Fig. 3 is a fragmentary sectional view through the brake unit taken on line III—III of Fig. 2.

Assuming that the brake unit 8, illustrated in Fig. 2, is that at the lower righthand corner of the diagrammatic showing of Fig. 1, pipe 22 will enter cylinder 100 at one end thereof, while pipe 34 is in communication with cylinder 100 at the opposite end. Thus, no pipe common to both the main and emergency brake system is called upon to function at the brake unit 8 and no part of this unit is likely to break or become out of order so that one or the other of pipes 24 or 36 is incapable of supplying air to operate connecting rod 84.

Figure 6:
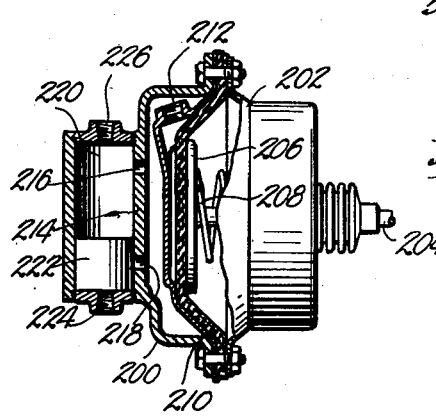
Fig. 6 is a fragmentary detailed sectional view through a brake unit made to embody a modified form of the invention.

In the modified form of the invention, illustrated in Fig. 6, the specially formed cap 200 is made to be attached directly upon housing 202 of the conventional unit. In this instance, connecting rod 204 having head 206 thereon is recriprocated to operate the brake in the manner as above set down.

Spring 208 serves to yieldably maintain rod 204 at one end of its path of travel and the diaphragm 210 is movable with head 206 as air under pressure is forced into housing 202 through inlet port 212.

There is always an inlet port in the nature of that illustrated in Fig. 6, but in some cases this inlet port is in a position different from that shown. In every instance, however, it is through the wall of housing 202 to one side of diaphragm 210, and when cap 200 is made as illustrated, it will contain therein the inlet port 212 whether it be exactly as that shown or of a different character and in a different position.

Cap 200 has a partition wall 214 through which ports 216 and 218 are provided.

Cylindrical compartment 200 contains valve 222 that is free to move in response to air under pressure that is introduced into compartment 220 by way of either ports 224 or 226. As hereinabove taught, these ports 224 and 226 are secured to the main or emergency system respectively, and the operation of the unit embodying a modified form of the invention is precisely the same as the operation of that form illustrated in Fig. 2.

When the compressor 12 has forced air into tank 10 and reservoir 26, check valve 40 will operate to preclude the escape of air from reservoir 26 while the main system employing air from tank 10 is in operation. When valve 14 which is usually operated by a foot pedal, is manipulated air will exert a force upon connecting rod 84 of each unit. The unit 8, at the lower righthand corner of Fig. 1, for instance, will have its connecting rod 84 moved to set the brakes by air passing from tank 10 through conduits 16, 18 and 22. When air enters cylinder 100 through pipe 22, it will force valve 102 to the position shown in Figs. 1 and 2 and will operate diaphragm 94 by entering housing 86 through port 98. Port 96 will be closed by valve 102 and the end of pipe 34 will likewise be closed so that air cannot escape from cylinder 100.

If any of the conduits of the main system herein outlined should happen to break, air from emergency reservoir 26 may be sent to all of the brake units 8 and again taking for example, the unit in the lower righthand corner of Fig. 1, air will pass from reservoir 26 through pipes 28, 32 and 34 when valve 30 is opened. Valve 102 will immediately be forced to the other end of cylinder 100 where it will close the end of pipe 22 and port 98. Port 96 will thereby be opened and air under pressure will move against diaphragm 94 to operate rod 84 in the desired normal manner.

When cap 200 forms a part of each brake unit, the opening and closing of ports 216 and 218 through the medium of valve 22 is accomplished in the same manner as hereinabove described, and since this specially formed cap may be applied to commercial type brake units now in use, it is obvious that an emergency system may be installed on vehicles where an air brake system with the emergency features is functioning.

Having thus described the invention, what is claimed as new and desired to be secured by Letters Patent is:

1. In an air brake system of the character described having a plurality of sets of brake units, a compressor, a storage tank for compressed air connected to the compressor, conduits interconnecting the brake units and said storage tank, and a control valve in one of the conduits, the combination of an emergency reservoir; a pipe joining the storage tank and said reservoir having a check valve therein precluding flow of air from the emergency reservoir to the storage tank; pipes independent of the said conduits, directly and independently interconnecting the said emergency reservoir and each of the brake units; and a valve to control the passage of air from the reservoir to the brake units.

2. In an air brake system of the character described having a plurality of sets of brake units, a compressor, a storage tank for compressed air connected to the compressor, conduits interconnecting the brake units and said storage tank, and a control valve in one of the conduits, the combination of an emergency reservoir; a pipe joining the storage tank and said reservoir having a check valve therein precluding flow of air from the emergency reservoir to the storage tank; pipes independent of the said conduits, independently interconnecting the said emergency reservoir and each of the brake units; a valve to control the passage of air from the reservoir to the brake units; and means carried within an integral part of each brake unit respectively, operable by air flowing from the reservoir, for precluding the flow of air into the conduit leading from the respective brake unit to the storage tank.

3. In an air brake system of the character described having a brake unit provided with a chamber, a compressor, a storage tank for compressed air connected to the compressor, conduits interconnecting the chamber and said storage tank, and a control valve in the conduit, the combination of an emergency reservoir adapted to receive compressed air from the compressor; pipes independent of the said conduits independently interconnecting the said chamber and the emergency reservoir; a valve in the pipe; and a valve member in said chamber common to either the conduits as said pipes whereby when air is entering the chamber from the conduits said pipes are closed by the valve member and when air is entering the chamber from the pipes, said conduits are closed.

4. In an air brake system of the character described having a brake unit comprising a housing provided with a chamber therein and at least one port formed through the housing for introducing air under pressure to the chamber, the combination of a cap adapted to be secured to the housing over the port; a partition in the cap forming two compartments and having a pair of ports therethrough; and a valve in one of said compartments movable to close one of the ports at a time, said port in the brake unit being in communication with the other compartment.

5. In an air brake system of the character described having a main air tank, an auxiliary air tank and a brake unit comprising a housing provided with a chamber therein and at least one port formed through the housing for introducing air under pressure to the chamber, the combination of a cap adapted to be secured to the housing over the port and having connection to the main and auxiliary air tanks; a partition in the cap having a pair of ports formed therethrough dividing the same into two compartments; a reciprocable valve in one of said compartments movable to close one of the ports at a time, said port in the brake unit being in communication with the other compartment, the compartment having the valve therein being connected to both the main air tank and the auxiliary air tank by separate pipes, the pipe leading from the main air tank and one of the ports in the partition being closed when the valve is at one end of its path of travel, the pipe leading to the auxiliary tank and the other of said ports in the partition being closed by the valve when the same is at the other end of its path of travel.

6. In an air brake system of the character described having a main air tank, an auxiliary air tank and a brake unit comprising a housing provided with a chamber therein and a port formed through the housing for introducing air under pressure to the chamber from both the main and the auxiliary air tank from a common pipe; an adaptor attached to the brake unit for introducing air under pressure to the said chamber from the main air tank through one pipe and from the auxiliary tank to the chamber through another pipe, said adaptor comprising a hollow casting having a partition therein provided with two ports and setting off two compartments in the casting; two openings formed in the casting in communication with one of the compartments whereby each of the pipes is individually placed in connection with the adaptor; and a reciprocable valve in said one compartment adapted to close one of the ports and one of the openings when held at one end of its path of travel by air under pressure entering the compartment through the other opening, the other compartment in the casting being formed to receive that portion of said brake unit having the port therein when the adaptor is secured to the brake unit.

RICHARD E. STANLEY.